United States Patent
Dettinger et al.

(10) Patent No.: US 9,026,796 B2
(45) Date of Patent: *May 5, 2015

(54) VIRTUAL WORLD EMBEDDED SECURITY WATERMARKING

(71) Applicant: International Business Machines Corporation, Armonk, NY (US)

(72) Inventors: Richard Dean Dettinger, Rochester, MN (US); Lydia M. Do, Research Triangle Park, NC (US); Frederick A. Kulack, Rochester, MN (US); Kevin G. Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,235

(22) Filed: Jun. 11, 2013

(65) Prior Publication Data

US 2013/0283055 A1     Oct. 24, 2013

Related U.S. Application Data

(63) Continuation of application No. 12/561,752, filed on Sep. 17, 2009, now Pat. No. 8,489,883.

(51) Int. Cl.
*H04L 29/06* (2006.01)
*H04L 9/32* (2006.01)
*G06F 21/16* (2013.01)

(52) U.S. Cl.
CPC .............. *H04L 9/3247* (2013.01); *G06F 21/16* (2013.01); *H04L 67/38* (2013.01); *H04L 63/102* (2013.01)

(58) Field of Classification Search
CPC ..... H04L 9/3247; H04L 63/102; G06F 21/16; G06F 3/04815
USPC ................ 713/176; 726/7; 715/706; 382/100
See application file for complete search history.

(56) References Cited

U.S. PATENT DOCUMENTS

| | | | |
|---|---|---|---|
| 2002/0124024 | A1 | 9/2002 | Patterson et al. |
| 2004/0247120 | A1 | 12/2004 | Yu et al. |
| 2006/0294465 | A1* | 12/2006 | Ronen et al. .................. 715/706 |
| 2008/0049971 | A1* | 2/2008 | Ramos et al. ................. 382/100 |
| 2008/0130944 | A1 | 6/2008 | Johnson et al. |
| 2009/0313084 | A1* | 12/2009 | Chugh ............................ 705/10 |
| 2010/0146608 | A1 | 6/2010 | Batie et al. |

OTHER PUBLICATIONS

Saint-Andre, P. et al., "XEP-0084: User Avatar," [online] Standards Track, Version 1.1, XMPP Standards Foundation © 1999-2011, Nov. 5, 2008, retrieved from the Internet: <http://xmpp.org/extensions/xep-0084.html>, 20 pgs.

* cited by examiner

*Primary Examiner* — Syed Zaidi
(74) *Attorney, Agent, or Firm* — Cuenot, Forsythe & Kim, LLC

(57) ABSTRACT

A method, apparatus, and program product are provided for using watermarks to embed security features on avatars in a virtual world. A watermark engine receives security information for an avatar in a virtual world. The watermark engine creates a watermark for the avatar using the security information and associates the watermark with the avatar. The watermark may comprise at least one of: security preferences for the avatar, contact information for an owner of the avatar, and graphical information to cause alteration of the avatar when the avatar is recorded.

20 Claims, 3 Drawing Sheets

VIRTUAL WORLD EMBEDDED SECURITY WATERMARKING

CROSS-REFERENCE TO RELATED APPLICATIONS

This application is a Continuation of U.S. application Ser. No. 12/561,752, filed on Sep. 17, 2009.

FIELD OF THE INVENTION

The invention relates to the field of avatars in a virtual world and more particularly to embedded security watermarks for protecting the privacy of avatars or aspects thereof.

BACKGROUND

In real life, a video recording can be used to capture live action, people, and circumstances unique to a moment in time. Home videos are a very common use for this type of medium and typically do not present significant liability issues. In some cases, however, particularly in a commercial use or public display of a video, recorded content may infringe upon the rights of those that appear in the video (i.e. participants). In these cases, discretion may be necessary for the display and sharing of the video content. In some instances releases or permission are obtained from the participants in the video. Typically, a release is obtained in the form of a signed contract granting permission to use images of a person or other images that are the property of another.

Images in a virtual world may also be recorded. Avatars (a virtual world user's presence in a virtual world including an image viewable by other users in the virtual world) may be altered when recorded to prevent other users from capturing the avatar.

SUMMARY

According to a sample embodiment of the present invention, a computer-implemented method is provided for using watermarks to embed security features on avatars in a virtual world. The method comprises receiving security information for an avatar in a virtual world; creating a watermark for the avatar comprising the security information; and associating the watermark with the avatar. The watermark may comprise at least one of: security preferences for the avatar, contact information for an owner of the avatar, and graphical information to cause alteration of the avatar when the avatar is recorded.

In one embodiment, the watermark comprises a security preference for the avatar and graphical information that causes alteration of an image of the avatar when the avatar is recorded. In response to a user recording the watermarked avatar, an avatar engine compares a user identification with the security preference. In response to the user identification not satisfying the security preference, the avatar engine alters the recorded avatar image using the graphical information.

According to another embodiment of the present invention, a computer system is provided for using watermarks to embed security features on avatars in a virtual world. The computer system comprises: a server interconnected with a plurality of clients through a network, a virtual world program stored on the memory and comprising a computer-readable program of instruction executable by the processor to provide an interactive virtual world environment to users of the plurality of clients, and a watermark program stored on the memory and comprising a computer-readable program of instruction executable by the processor to embed a security watermark on an avatar. The server comprises an interconnected processor and memory. The watermark program comprises a computer-readable program of instruction executable by the processor to: receive security information for an avatar in a virtual world; create a watermark for the avatar comprising the security information; and associate the watermark with the avatar.

According to another embodiment of the present invention, a computer program product is provided for using watermarks to embed security features on avatars in a virtual world. The computer program product comprises a computer-readable storage media having encoded thereon program instructions for providing a watermark for an avatar in a virtual world. The program instructions comprise: program instructions for receiving security information for an avatar in a virtual world; program instructions for creating a watermark for the avatar comprising the security information; and program instructions for associating the watermark with the avatar.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The present invention provides a method, system and computer program product for using watermarks to embed security features on avatars in a virtual world.

A virtual world is a simulated environment in which users may be represented by avatars. An avatar may be used to "travel" through locations of the virtual world, such as virtual streets, buildings, rooms, etc. While in a given location, an avatar may also be used to interact with objects or other avatars present therein. For example, an avatar may be able to approach another avatar, and may interact with the other avatar by communicating, performing financial transactions, and the like. Thus, multiple users, although in different physical locations, may be present in the same virtual location, and may interact therein by using their respective avatars.

One way that avatars may interact in a virtual world is by recording other avatars. As in the real world, some users may wish to limit or control the use and distribution of recorded images of their avatars. According to a sample embodiment of the present invention, a user can create a watermark for his/her avatar to embed security preferences for images of the avatar and control use of the images.

In the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
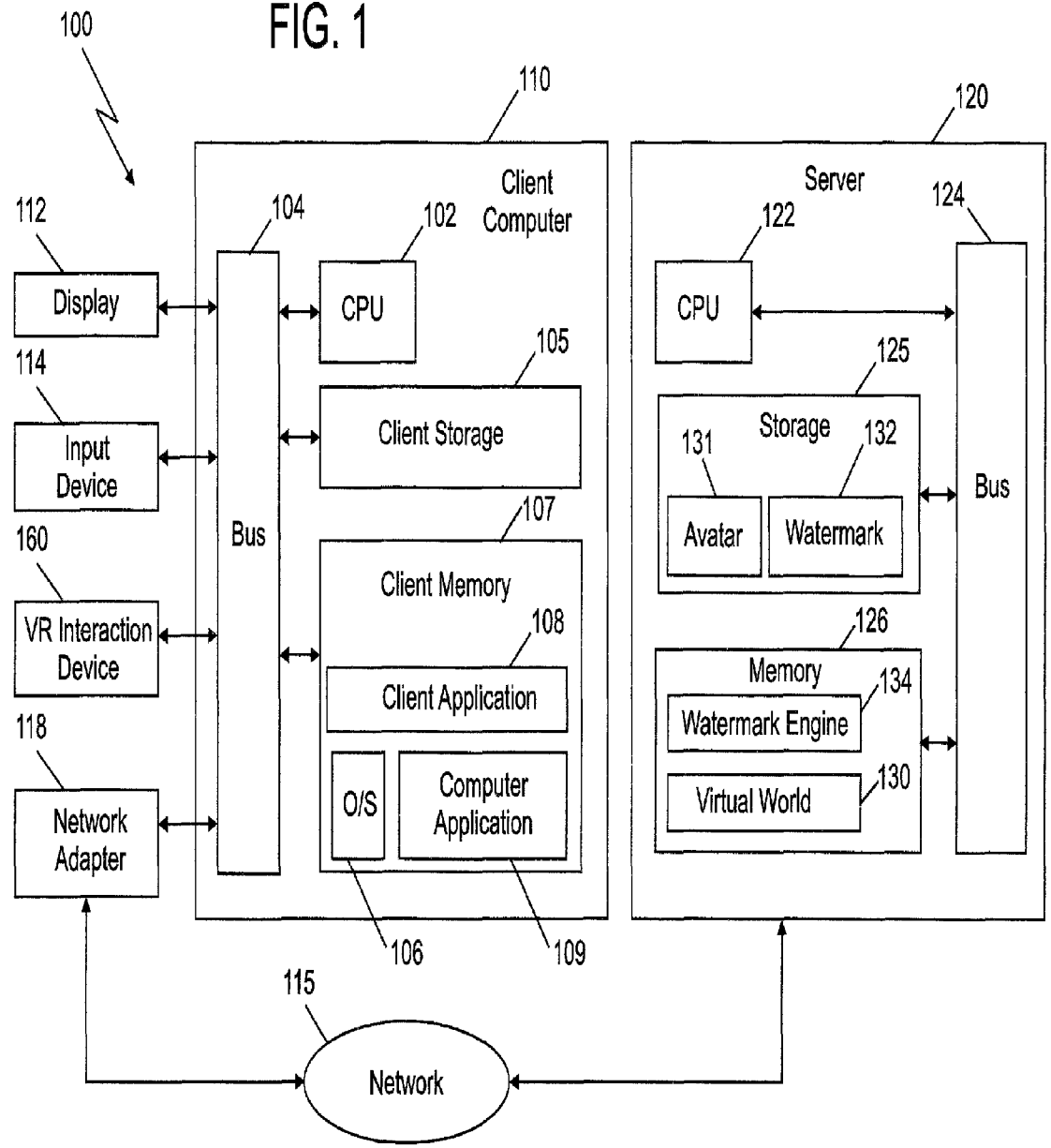
FIG. 1 is a block diagram of a system for using watermarks to embed security features on avatars in a virtual world to protect avatars or aspects thereof according to a sample embodiment of the present invention.

FIG. 1 is a block diagram that illustrates a client server view of a computing environment 100, according to one embodiment of the invention. As shown, computing environment 100 includes client computers 110, network 115 and server system 120. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each client computer 110 includes a central processing unit (CPU) 102 (also referred to as a "processor", herein), which obtains instructions and data via a bus 104 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. It should be understood that programs may be transferred in whole or in part to a random access memory (RAM) not shown, which is also interconnected through the bus 104, then executed by the CPU 102 from the RAM. Client computer 110 is operably connected to the network 115, such as through a network adapter 118, for example. Client memory 107 includes an operating system (OS) 106, a client application 108, and a communication application 109 such as email, instant messenger, or the like. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, the client application 109 provides a software program that allows a user to connect to a virtual world 130 on the server 120, and once connected, to perform various user actions within the virtual world. Such actions may include exploring virtual locations, interacting with other avatars, and interacting with virtual objects. Further, the client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to the virtual world 130. Such a display may include content from the virtual world determined from the user's line of sight at any given time. For the user, the display may present a third-person perspective, meaning a view from a location other than that of the user's avatar, and which may include the image of the user's avatar within the virtual world. Alternatively, the display may present a first-person perspective, meaning a view of the virtual world as would be seen through the eyes of the avatar representing the user.

The user may view the virtual world using a display device 112, such as an LCD or CRT monitor display, and interact with the client application 109 using input devices 114. Further, in one embodiment, the user may interact with the client application 109 and the virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within the virtual world 130.

In a virtual world environment, users are known to record actions or situations occurring in the virtual world including his/her avatar, the avatar of another user, and/or objects or locations within the virtual world. However, the owners of other avatars and/or objects and locations may want to limit or control the distribution and use of recorded images of their avatars, locations, and/or objects. One method for discouraging unauthorized recording and use of an avatar is to cause the avatar image to be altered when it is recorded.

As shown, the server system 120 includes a CPU or processor 122, which obtains instructions and data via a bus 124 from memory 126 and storage 125. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 125 may be considered to include memory physically located elsewhere in a server 120, for example, on another computer coupled to the server 120 via bus 124. The server system 120 may be operably connected to the network 115, which generally represents any kind of data communications network.

Accordingly, the network 115 may represent both local and wide area networks, including the Internet.

In one embodiment, storage 125 may include a set of avatars 131 that can be manipulated in the virtual world 130 through client application 109 on client computer 110. The avatars comprise code which defines the appearance of the avatar image to users of the virtual world. For example, the avatar may be a visual representation of the user or the user's alter ego in the form of a three-dimensional model. A watermark 132 may be embedded on the avatar to provide security for the avatar image in the virtual world. The watermark 132 comprises program code that may perform one or more security functions, including: security preferences for the avatar, contact information for an owner of the avatar, and graphical information to cause alteration of the avatar when the avatar is recorded.

Security preferences may comprise any data structure suited to the current application, such as a database table, XML document, flat file, and the like. The security preference may comprise a list of other users who are authorized to view, capture or record the avatar and perform one or more of: distributing, displaying, and altering the recorded avatar image and who the recorded image may be shared with. The security preference may also define whether or not a separate permission is required for each recording, use, distribution, or sharing of the avatar image. The security preference may also define terms and conditions of use of recordings of the avatar, such as the extent and type of modification that is allowed, the duration of use allowed, how or in what context the avatar image may be used.

Graphical information to cause alteration of the avatar when the avatar is recorded comprises program code that determines when the avatar is being recorded and program code to alter the avatar image in response to detecting recording of the avatar image. The avatar may be altered by one or more of: pixilation, blurring, censoring, abstracting, mirroring, or distortion of at least a part of the avatar image; change in the hue, tone, saturation, brightness, or scale of the avatar image; graphical text, symbol, or icon inserted over or under the avatar image; aging, fading, or scrambling the avatar image relative to other images in an environment; and slowing or accelerating movement of the avatar image relative to other images in an environment. The graphical information may be in the form of program code which is executed when the avatar image is recorded using known technology.

Contact information may be imbedded in the avatar image and presented when a user interacts with the recorded avatar, such as by hovering over the avatar using a mouse, for example. The contact information may be pre-defined by the user who owns the avatar through an interactive program during or after creation of the avatar. The information may be provided in any way suitable for providing information to a program, including but not limited to through options in a pull-down menu, through a dialog box, or the like.

Contact information may include the identity of the user who owns the avatar, who may or may not contact the owner of the avatar (such as by a list or table of permitted and/or blocked avatars or users). For example a user may only want to allow contact from a person listed as a friend on the user's profile within the virtual world or on a social network. The contact information may also include directions on how to contact the owner for permission or licensing of the avatar image. For example, a user may prefer to be contacted by email, through the virtual world application, by phone, or any other means of contact. The contact information may also define whether or not subsequent releases of the avatar image can be cleared via a licensing agreement and whether or not an image or video needs to be tagged to be associated with the avatar image or user being captured and/or recorded. An event in a virtual world known as "the metaverse".

In one embodiment, a watermark engine 134 is stored in server memory 126. The watermark engine 134 comprises program code executable by the server processor 122 to create a watermark 132 and embed the watermark 132 on an avatar 131. The watermark engine 134 may comprise menus, a dialog box, or any other interactive program to allow a user to interactively create a watermark 132.

According to one example embodiment, an avatar "Ima Director" attends an event in a virtual world known as "the metaverse". During the event, a dance is performed by several avatars, which is recorded by Ima Director. Two of the dancing avatars: "Ava Ex" and "Jenna Blur" have been embedded with watermarks by their respective owners/users to protect their use. The Watermark for Ava Ex comprises a security preference that excludes Ima Director. The security preference may not allow any other avatars to capture or record it. Alternatively, the security preference for Ava Ex may allow specific avatars, users, or classes or groups of avatars or users to access the Ava Ex image without alteration, but not allow access by others. Graphical information is also included in the Ava Ex watermark that causes recorded images of Ava Ex to appear with a pixilated "X" on her person. The watermark for Ava Ex also comprises contact information that is presented when the avatar is interacted with or triggered by other users. Accordingly, when Ima Director hovers on Ava Ex contact information is presented. The contact information states that no permission will ever be granted to record this avatar. The contact information further suggests that the user edit out the Ava Ex avatar from the recorded video. In another embodiment the contact information may alternatively or additionally allow for substitution with another avatar's likeness. In another alternative embodiment, no contact information is included in the watermark, and the user participating in the virtual world as Ima Director is unable to remove the alteration or contact the user for Ava Ex.

The watermark for Jenna Blur comprises a security preference in the form of a list or table defining who may access the Jenna Blur avatar image without alteration. The watermark for Jenna Blur also comprises information to cause alteration of the avatar when the avatar is recorded. Specifically, the information blurs the face of the Jenna Blur avatar image making it difficult to recognize the identity of the avatar. The watermark for Jenna Blur further comprises contact information. The contact information comprises program code that opens a user's email application and the email address is provided to contact the owner of the Jenna Blur avatar to request release of Jenna Blur images.

Ima Director is not on the list for access to unaltered images of the Jenna Blur avatar, so when the user associated with Ima Director watches the video recording, the Jenna Blur avatar appears with her face blurred. Upon interacting with the Jenna Blur avatar (such as by hovering over it with a mouse), the contact information from the watermark is triggered, and the user associated with Ima Director has his/her email application opened and the email address for contacting the owner of the Jenna Blur avatar is inserted. Triggering the watermark may optionally also cause a sampling of the unaltered image for the avatar to be displayed in the hovered area. The user associated with the Ima Director avatar sends an email requesting release of the images and attaches a sample of the video.

The approval of an access agreement or authorization by the avatar owner is stored on the watermark. This authorization triggers the back end watermark engine 134 to unlock the feature for the authorized user. This may be accomplished in any way that is effective for access authorization. For example, the owner of the Jenna Blur avatar may add Ima Director to an authorized access list. Alternatively, the owner of the Jenna Blur avatar may enter an access code on the sample video matching an access code on the watermark 132 to unlock the feature.

Figure 2:
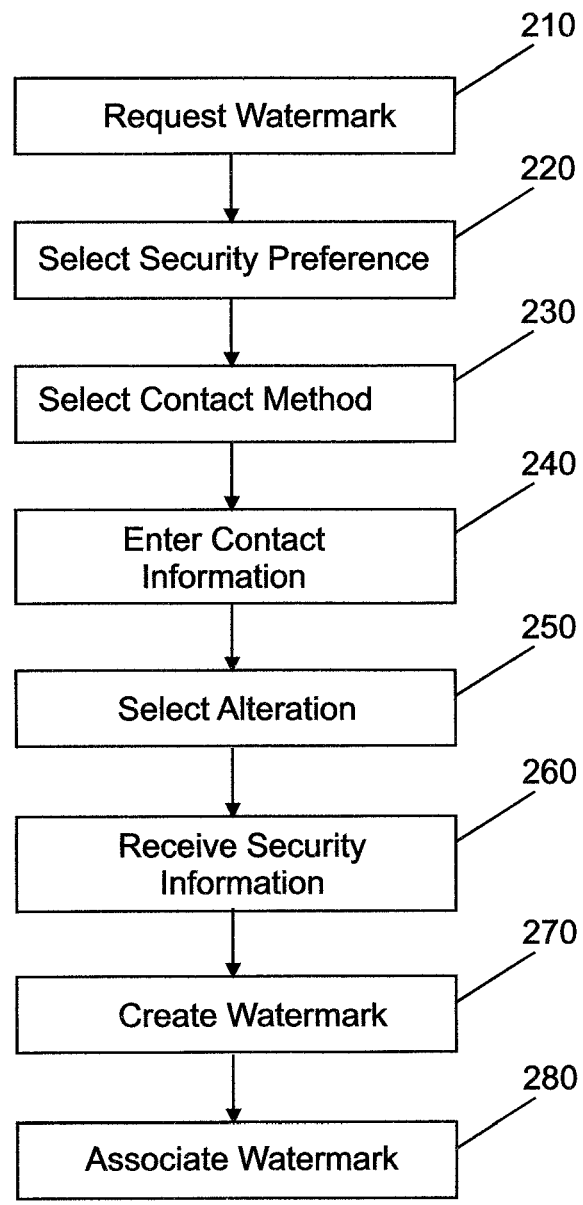
FIG. 2 is a flow diagram of a method for embedding a security watermark for protecting the privacy of an avatar or aspects thereof according to a sample embodiment of the present invention.

FIG. 2 is a flow diagram for a method for embedding a security watermark for protecting the privacy of an avatar or aspects thereof according to a sample embodiment of the present invention. A user begins by requesting creation of a watermark (step 210). The request is received by watermark engine 134. The user may create a watermark for an existing avatar, or he/she may create a watermark during the initial creation of the avatar. Then, the user defines the watermark by specifying security information. The user may specify one or more of: a security preference (step 220), a contact method (step 230), contact information (step 240), and alteration (step 250).

The watermark engine 134 receives the security information entered by the user (step 260). The watermark engine 134 then uses the security information to create a watermark 132 (step 270). Then, the watermark engine 134 associates the watermark with the corresponding avatar (step 280). The watermark may be associated with a corresponding avatar by embedding the watermark in the avatar.

Figure 3:
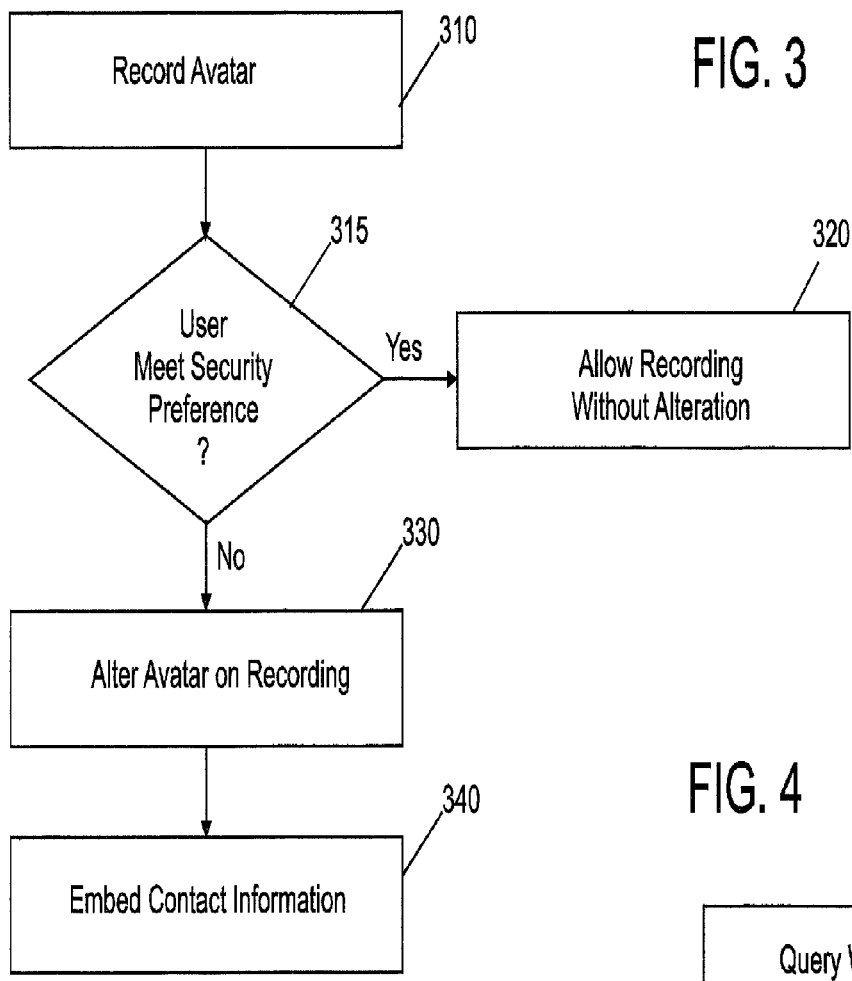
FIG. 3 is a flow diagram of a method of protecting an avatar or aspects thereof using an embedded security watermark according to a sample embodiment of the present invention.

FIG. 3 is a flow diagram of a method of protecting an avatar or aspects thereof using an embedded security watermark 132 according to a sample embodiment of the present invention. A second avatar records an avatar with a watermark in a virtual world (step 310). The watermark engine 134 determines whether or not the avatar doing the recording meets the security preference (step 315). That is the watermark engine 134 compares the recording avatar to a security preference list to determine whether or not the recording avatar is authorized to access the avatar without alteration. If the recording avatar meets the security preference (Y-branch), then the recording avatar is allowed to record the watermarked avatar without alterations to the watermarked avatar's appearance (step 320). If the recording avatar does not meet the security preference (N-branch), then the watermark engine 134 alters the appearance of the watermarked avatar according to the alteration method previously defined in the watermark (step 330), and embeds the previously defined contact information (step 340).

Figure 4:
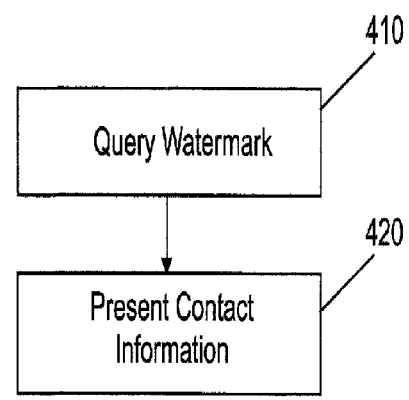
FIG. 4 is a flow diagram of a method for obtaining contact information from an embedded watermark according to a sample embodiment of the present invention.

FIG. 4 is a flow diagram of a method for obtaining contact information from an embedded watermark according to a sample embodiment of the present invention. When the user associated with the recording avatar views the video with recorded images of the watermarked avatar, the avatar appears altered if the security preference was not met. The user may then query the watermark 132 by hovering over it with a mouse or any other method appropriate for triggering the watermark (step 410). In response to being queried, the watermark presents the embedded contact information to the user (step 420)

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain or store the program for use by or in connection with the instruction execution system, apparatus, or device.

The foregoing method may be realized by a program product comprising a machine-readable media having a machine-executable program of instructions, which when executed by a machine, such as a computer, performs the steps of the method. This program product may be stored on any of a variety of known machine-readable media, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The preceding description and accompanying drawing are intended to be illustrative and not limiting of the invention. The scope of the invention is intended to encompass equivalent variations and configurations to the full extent of the following claims.

What is claimed is:

1. A computer-implemented method for embedding a security feature in an avatar in a virtual world, comprising:
creating, using a processor, a watermark for the avatar;
associating the watermark with the avatar; and
selectively altering a recorded image of the avatar based upon
the avatar having been recorded by another virtual world user, and
recording privileges particular to the avatar, wherein
the watermark includes security information comprising the recording privileges particular to the avatar.

2. The method of claim 1, wherein
the security information comprises contact information for an owner of the avatar.

3. The method of claim 2, wherein
the selective altering includes embedding the contact information in the recorded image of the avatar.

4. The method of claim 3, further comprising:
presenting, responsive to receiving a query of the recorded image of the recorded avatar, the embedded contact information, wherein
the security information comprises a list of other users who may contact the owner of the avatar.

5. The method of claim 1, wherein
the security information comprises graphical information that causes alteration of an image of the avatar upon the avatar being recorded in the virtual world.

6. The method of claim 5, wherein
the graphical information defines a part of the recorded image of the avatar to be altered.

7. The method of claim 1, further comprising
comparing the another virtual world user with the security information, wherein
the security information comprises a listing of users authorized to access the avatar without alteration.

8. A server configured to embed a security feature in an avatar in a virtual world, comprising:
a computer hardware system, wherein the computer hardware system is configured to initiate and/or perform:
creating a watermark for the avatar;
associating the watermark with the avatar; and
selectively altering a recorded image of the avatar based upon
the avatar having been recorded by another virtual world user, and
recording privileges particular to the avatar, wherein
the watermark includes security information comprising the recording privileges particular to the avatar.

9. The server of claim 8, wherein
the security information comprises contact information for an owner of the avatar.

10. The server of claim 9, wherein
the selective altering includes embedding the contact information in the recorded image of the avatar.

11. The server of claim 10, wherein the computer hardware system is further configured to initiate and/or perform:
presenting, responsive to receiving a query of the recorded image of the recorded avatar, the embedded contact information, wherein
the security information comprises a list of other users who may contact the owner of the avatar.

12. The server of claim 8, wherein
the security information comprises graphical information that causes alteration of an image of the avatar upon the avatar being recorded in the virtual world.

13. The method of claim 12, wherein
the graphical information defines a part of the recorded image of the avatar to be altered.

14. The server of claim 8, wherein the computer hardware system is further configured to initiate and/or perform:
comparing the another virtual world user with the security information, wherein
the security information comprises a listing of users authorized to access the avatar without alteration.

15. A computer program product, comprising:
a computer usable storage device having stored therein computer usable program code for embedding a security feature in an avatar in a virtual world,
the computer usable program code, which when executed by a computer hardware system, causes the computer hardware system to perform:
creating a watermark for the avatar;
associating the watermark with the avatar; and
selectively altering a recorded image of the avatar based upon
the avatar having been recorded by another virtual world user, and
recording privileges particular to the avatar, wherein
the watermark includes security information comprising the recording privileges particular to the avatar, wherein
the computer usable storage device is not a transitory, propagating signal per se.

16. The computer program product of claim 15, wherein
the security information comprises contact information for an owner of the avatar.

17. The computer program product of claim 16, wherein
the selective altering includes embedding the contact information in the recorded image of the avatar.

18. The computer program product of claim 17, wherein the computer usable program code further causes the computer hardware system to perform:
presenting, responsive to receiving a query of the recorded image of the recorded avatar, the embedded contact information, wherein
the security information comprises a list of other users who may contact the owner of the avatar.

19. The computer program product of claim 15, wherein
the security information comprises graphical information that causes alteration of an image of the avatar upon the avatar being recorded in the virtual world.

20. The computer program product of claim 15, wherein the computer usable program code further causes the computer hardware system to perform:
comparing the another virtual world user with the security information, wherein
the security information comprises a listing of users authorized to access the avatar without alteration.

* * * * *